(12) United States Patent
Kim et al.

(10) Patent No.: US 8,329,333 B2
(45) Date of Patent: Dec. 11, 2012

(54) BATTERY MODULE WITH PLURALITY OF BATTERIES HAVING BENT TERMINAL PORTIONS CONNECTED WITH FIXING PLATE

(75) Inventors: Yong-Sam Kim, Suwon-si (KR); Sang-Won Byun, Suwon-si (KR); Byung-Kyu Ahn, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 382 days.

(21) Appl. No.: 12/591,733

(22) Filed: Nov. 30, 2009

(65) Prior Publication Data

US 2010/0151312 A1    Jun. 17, 2010

(30) Foreign Application Priority Data

Dec. 11, 2008    (KR) .................. 10-2008-0126040

(51) Int. Cl.
*H01M 2/24* (2006.01)
*H01M 2/26* (2006.01)
*H01M 2/28* (2006.01)
(52) U.S. Cl. ......... 429/158; 429/149; 429/160; 429/161
(58) Field of Classification Search .................. 429/158, 429/149, 160, 161
See application file for complete search history.

(56) References Cited

U.S. PATENT DOCUMENTS

| 7,074,517 | B2 | 7/2006 | Higashino |
| 7,270,576 | B2 | 9/2007 | Kim et al. |
| 7,270,912 | B2 | 9/2007 | Oogami |
| 7,273,679 | B2 | 9/2007 | Yoon et al. |
| 7,364,817 | B2 | 4/2008 | Lee |
| 7,393,608 | B2 | 7/2008 | Cho |
| 7,479,040 | B2 | 1/2009 | Cho |
| 7,488,556 | B2 | 2/2009 | Byun et al. |
| 7,507,124 | B2 | 3/2009 | Kim |
| 7,510,791 | B2 | 3/2009 | Moon et al. |
| 2002/0136944 | A1* | 9/2002 | Nemoto et al. ............... 429/120 |
| 2004/0021442 | A1 | 2/2004 | Higashino |
| 2004/0050414 | A1 | 3/2004 | Oogami |
| 2006/0091855 | A1 | 5/2006 | Seo |
| 2006/0215334 | A1 | 9/2006 | Hong et al. |
| 2007/0292753 | A1* | 12/2007 | Zama et al. ................... 429/181 |
| 2008/0176135 | A1 | 7/2008 | Byun et al. |
| 2009/0162744 | A1* | 6/2009 | Zheng et al. .................. 429/120 |

FOREIGN PATENT DOCUMENTS

| JP | 2006-066322 | | 3/2006 |
| JP | 2007-324004 | | 12/2007 |
| JP | 2007323952 A | * | 12/2007 |
| JP | 2008-123800 | | 5/2008 |

OTHER PUBLICATIONS

Okada et al., Machine translation of JP 2007323952 A, Dec. 2007.*
Yamauchi et al., Machine translation of JP 2008123800 A, May 2008.*

* cited by examiner

*Primary Examiner* — Basia Ridley
*Assistant Examiner* — Sean P Cullen
(74) *Attorney, Agent, or Firm* — Robert E. Bushnell, Esq.

(57) ABSTRACT

A battery module includes a plurality of unit batteries, each including a positive terminal and a negative terminal which protrude outside of each unit battery and which have bent terminal portions, and a connection member which electrically connects the unit batteries with each other and which includes a fixing plate fixed to the bent terminal portions of adjacent unit batteries by welding so as to improve productivity and provide high stability.

18 Claims, 7 Drawing Sheets

BATTERY MODULE WITH PLURALITY OF BATTERIES HAVING BENT TERMINAL PORTIONS CONNECTED WITH FIXING PLATE

CLAIM OF PRIORITY

This application makes reference to, incorporates the same herein, and claims all benefits accruing under 35 U.S.C. §119 from an application earlier filed in the Korean Intellectual Property Office on Dec. 11, 2008 and there duly assigned Serial No. 10-2008-0126040.

BACKGROUND OF THE INVENTION

1. Field of the Invention

The present invention relates to a battery module, and more particularly, to a battery module having an improved structure in which rechargeable batteries are electrically connected to each other.

2. Description of the Related Art

Rechargeable batteries can be repeatedly charged and discharged, unlike primary batteries that cannot be repeatedly charged. Low-capacity rechargeable batteries are used for portable compact electronic apparatuses such as mobile phones, notebook computers, and camcorders, and high-capacity rechargeable batteries are widely used as a power source for driving a motor of a hybrid vehicle, etc.

A high-output rechargeable battery using a non-aqueous electrolyte having high energy density has been developed in recent years. The high-output rechargeable battery is configured with high capacity by connecting a plurality of rechargeable batteries in series so as to be used for driving a motor for an apparatus requiring a large amount of power, i.e., an electrical vehicle, etc.

Furthermore, one high-capacity rechargeable battery is constituted by a plurality of rechargeable batteries which are connected to each other in series. The rechargeable batteries may have a cylindrical shape, a prismatic shape, and so forth.

The prismatic-shaped rechargeable battery includes an electrode assembly which has a positive electrode and a negative electrode with a separator interposed therebetween, a case having a space incorporating the electrode assembly, a cap plate which seals the case and has a terminal hole into which an electrode terminal is inserted, and an electrode terminal which is electrically connected with the electrode assembly and is inserted into the terminal hole to protrude outside of the case.

The rechargeable batteries are electrically connected with each other by a connection plate to constitute a battery module. The electrode terminal is fixed to the cap plate by a nut coupled to an upper portion of the electrode terminal, the connection plate is joined onto the nut, and the nut is joined onto the connection plate, such that the connection plate and the electrode terminal are electrically connected to each other.

However, a structure of fixing the connection plate with the nut is vulnerable to external vibration or shock. That is, when the nut is loosened by vibration or shock, electrical contact between the electrode terminal and the connection plate is deteriorated.

In order to solve the above-mentioned problem, a structure is proposed in which the electrode terminal is formed in a plate shape and the connection plate is fixed to the electrode terminal by welding, etc. However, this structure has a difficulty of welding each electrode terminal. Furthermore, after the connection plate is installed in the electrode terminal, the welding is performed. At this time, a jig for fixing the connection plate to the electrode terminal must be installed. As such, when each electrode terminal is welded in a state in which the jig is installed, the process is complicated and productivity is deteriorated.

In addition, the electrode terminal and the connection plate use materials having high electrical conductivity in order to suppress generation of heat and minimize loss of electric power. However, since these materials have high thermal conductivity as well as high electrical conductivity, welding heat is too rapidly transferred, such that the welding is very difficult and the quality of the welded part is deteriorated. In particular, when the welding is performed by a comparatively easy resistance welding scheme, resistance is small and transfer of the heat is rapid, such that the welding becomes very difficult. If arc welding or the like, other than resistance welding, is adopted, the transfer of the heat is rapid, such that melting does not normally occur and the welding process becomes inefficient.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment of the present invention has been made in an effort to provide a battery module which is capable of stably connecting rechargeable batteries.

An exemplary embodiment of the present invention provides a battery module which includes a plurality of unit batteries including a positive terminal and a negative terminal which protrude outside and have bent terminal portions, and a connection member which electrically connects the unit batteries with each other, and which includes a fixing plate fixed to bent terminal portions of adjacent unit batteries by welding.

The electrode terminal may include a protruding terminal portion and a bent terminal portion bent from the protruding terminal portion. The bent terminal portion formed in the positive terminal and the bent terminal portion formed in the negative terminal may be bent in different directions.

Grooves may be formed at a bent edge of the electrode terminal such that the bent terminal portion is easily bent. The connection member may include a fixing portion fixed to the bent terminal portions of the positive and negative terminals by welding, and a supporting portion which is bent from the fixing portion and is in contact with the protruding terminal portion.

A projection portion which is in contact with a top surface of the electrode terminal may be formed in the supporting portion. A projection portion which is in contact with the top surface of the electrode terminal may be formed in the fixing portion.

A welding plate having greater electrical resistance than that of the connection member may be installed between the connection member and the bent terminal portion. The welding plate may be made of a material having a lower melting point than that of the connection member.

The connection member may be fixed to the positive terminal and the negative terminal by resistance welding. The connection member may be made of a hetero-junction metal (clad metal). A metal disposed on a surface of the connection member, which faces the bent terminal portion, may have greater electrical resistance than that of a metal disposed on a surface of the connection member which faces a direction opposite thereto. The metal disposed on the surface of the connection member, which faces the bent terminal portion, may have a lower melting point than that of the metal disposed on the surface of the connection member which faces the direction opposite thereto.

According to an exemplary embodiment of the present invention, bent terminal portions are formed in a positive terminal and a negative terminal and the connection member is fixed to the bent terminal portion by welding, such that the connection member can be easily welded to the positive terminal and the negative terminal. Therefore, productivity is improved.

Furthermore, the connection member is fixed to the terminals by welding, such that electrical contact between the connection member and the terminals can be prevented from being deteriorated due to external vibration or shock.

Since a welding plate is installed between the connection member and the terminals, the connection member can be easily welded to the terminals, such that welding quality becomes excellent. Therefore, the overall stability of a battery module is improved.

Since a projection is formed in the connection member, the connection member can be easily welded to the terminals without an additional jig.

Since the connection member is made of a hetero junction metal, weldability between the connection member and the terminals can be improved. As a result, electrical contact between the connection member and the terminals is prevented from being deteriorated due to external vibration or shock, thereby improving the stability of the battery module.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Embodiments of the present invention will be described more fully hereinafter with reference to the accompanying drawings, in which exemplary embodiments of the invention are shown so as to be realized by those skilled in the art. However, the present invention may be modified in various ways, all without departing from the spirit or scope of the present invention, and the invention is not limited to embodiments described hereafter. In addition, like reference numerals denote like elements in the specification and the accompanying drawings.

Figure 1:
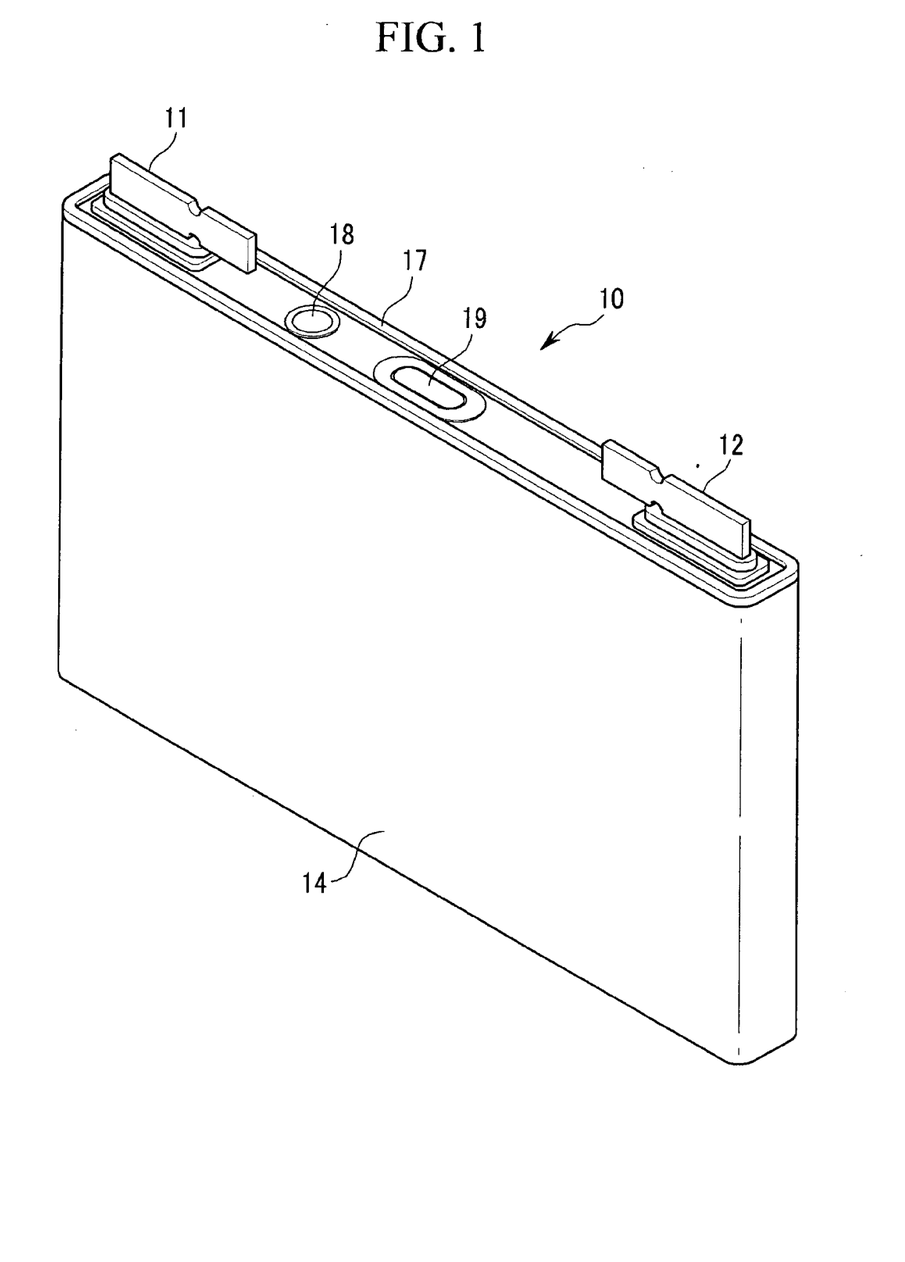
FIG. 1 is a perspective view of a rechargeable battery according to a first exemplary embodiment of the present invention.
Figure 2:
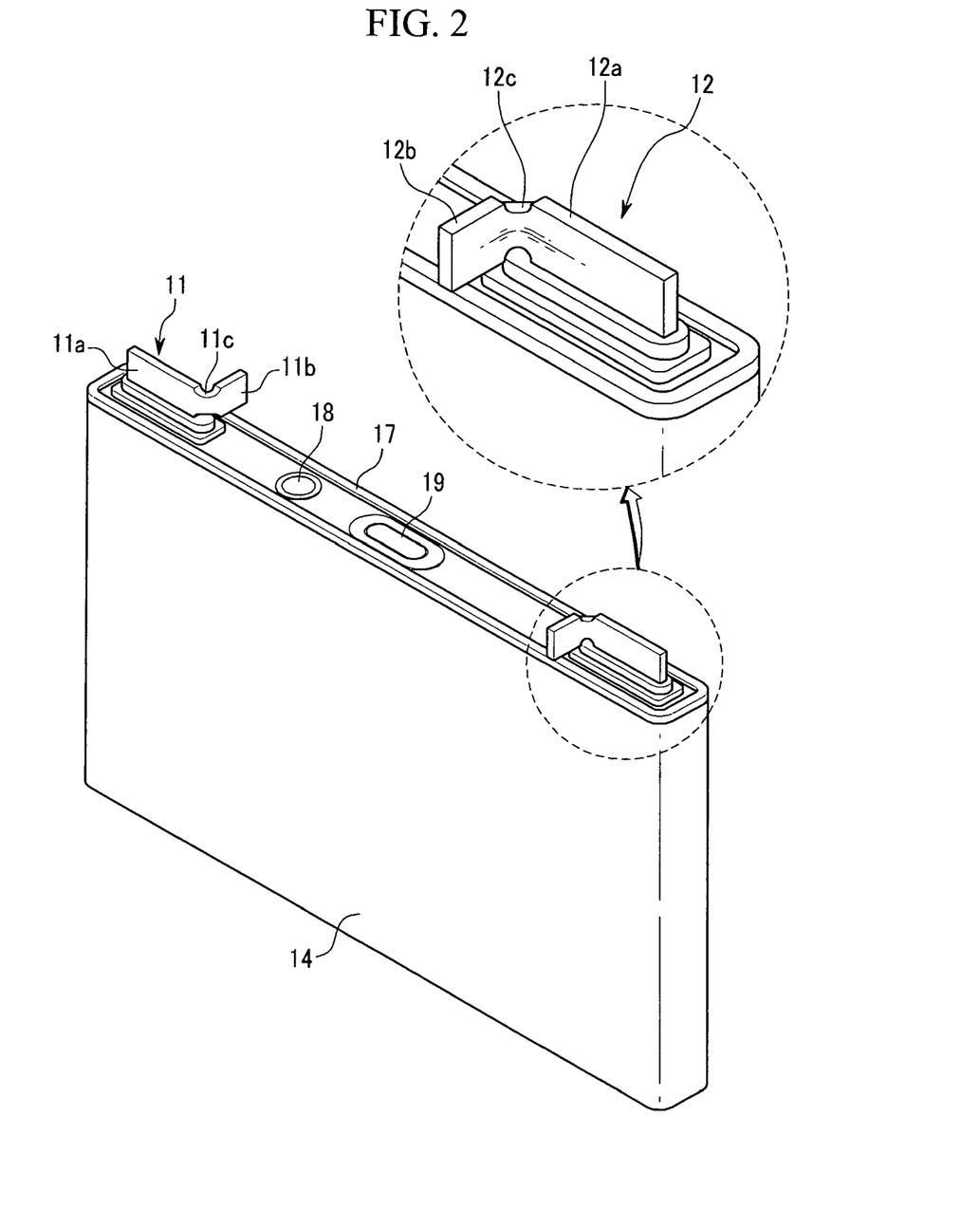
FIG. 2 is a perspective view of the rechargeable battery of FIG. 1 having a positive terminal and a negative terminal which are bent.

FIG. 1 is a perspective view of a rechargeable battery according to a first exemplary embodiment of the present invention, and FIG. 2 is a perspective view of the rechargeable battery of FIG. 1 having a positive terminal and a negative terminal which are bent.

Referring to FIGS. 1 and 2, the rechargeable battery 10 includes a case 14 having an inner space, a cap plate 17 coupled to an opening of the case 14, and a positive terminal 11 and a negative terminal 12 which protrude from the top of the cap plate 17.

The rechargeable battery 10 according to the exemplary embodiment, as a prismatic-shaped rechargeable battery, may include a lithium ion rechargeable battery, a nickel hydrogen rechargeable battery, or a lithium polymer rechargeable battery.

The case 14 has a hexahedral shape extending substantially in one direction. The case 14 has an inner space and an opening (not shown) formed at one end thereof. In the exemplary embodiment, although the hexahedral prismatic-shaped rechargeable battery has been exemplified, the present invention is not limited thereto, and the case may have various shapes, such as a cylindrical shape, etc.

An electrode assembly (not shown), which is repeatedly charged and discharged depending on flow of ions, is inserted into the case 14. The cap plate 17 is coupled to the opening to thereby seal the case 14.

The cap plate 17 is formed of a thin plate. An electrolyte inlet, into which an electrolytic solution is injected, is formed in the cap plate 17, and a sealing cap 18 is installed in the electrolyte inlet. Furthermore, a vent portion 19 having a groove, which may be fractured depending on an internal set pressure, is installed in the cap plate 17.

The positive terminal 11 and the negative terminal 12 are electrically connected to the electrode assembly and protrude outside of the cap plate 17.

As shown in FIG. 1, after the positive terminal 11 and the negative terminal 12 are formed in a flat panel shape, the positive terminal 11 and the negative terminal 12 are bent as shown in FIG. 2.

The positive terminal 11 includes a protruding terminal portion 11a which is vertically erected on a top surface of the cap plate 17 and a bent terminal portion 11b which is bent at the protruding terminal portion 11a. A groove 11c is formed between the bent terminal portion 11b and the protruding terminal portion 11a such that the bent terminal portion 11b can be easily bent.

Similarly, the negative terminal 12 also includes a protruding terminal portion 12a which is vertically erected on the top surface of the cap plate 17, and a bent terminal portion 12b which is bent at the protruding terminal portion 12a. A groove 12c is formed between the bent terminal portion 12b and the protruding terminal portion 12a such that the bent terminal portion 12b can be easily bent.

The grooves 11c and 12c are formed at upper and lower ends of the bend. Therefore, the bent terminal portions 11b and 12b can be easily bent at a predetermined position. The bent terminal portions 11b and 12b are bent so as to be substantially perpendicular to the protruding terminal portions 11a and 12a, respectively. The protruding terminal portions 11b and 12b of the positive and negative terminals 11 and 12, respectively, are bent in opposite directions relative to each other.

Figure 3:
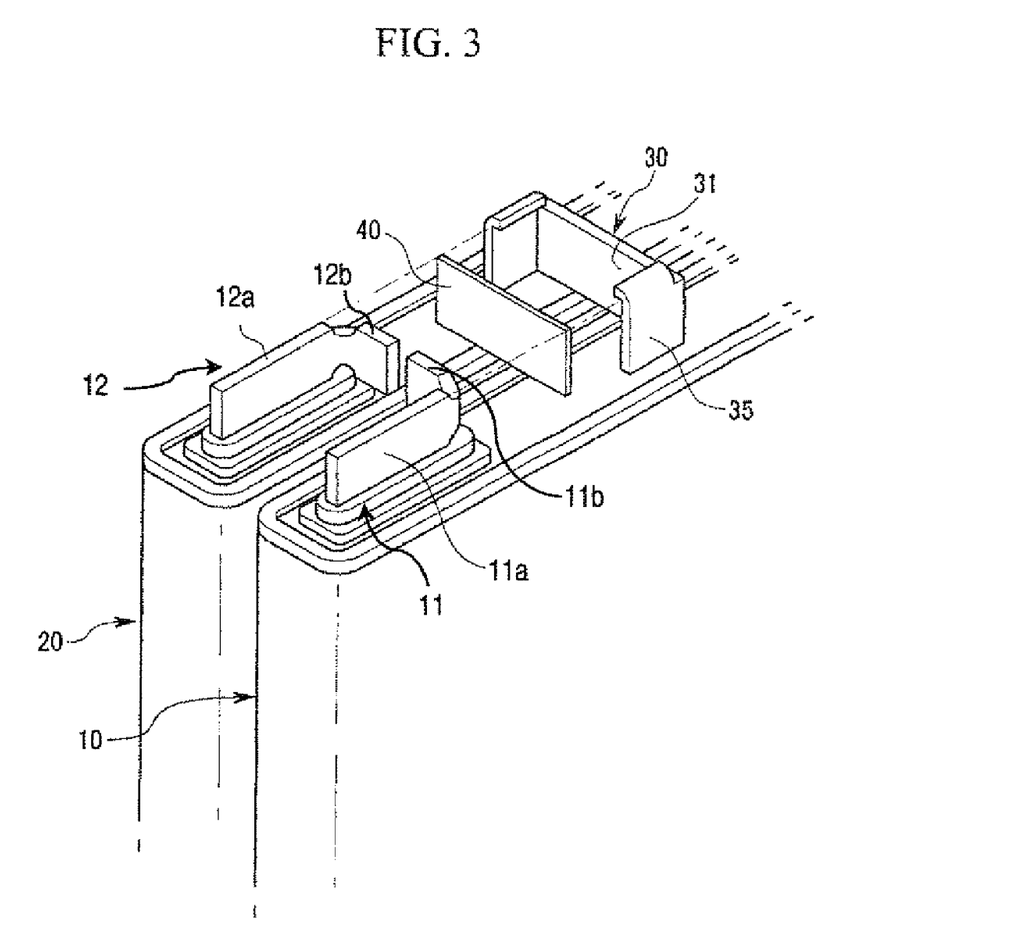
FIG. 3 is an exploded perspective view of rechargeable batteries and a connection member according to the first exemplary embodiment of the present invention.
Figure 4:
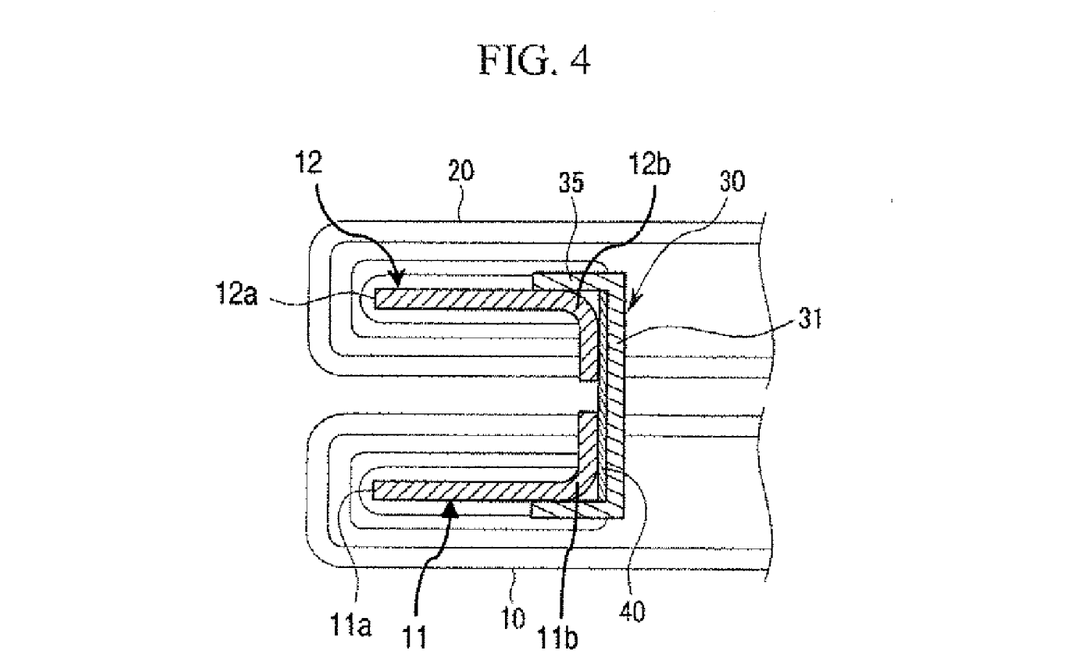
FIG. 4 is a transverse cross-sectional view of a state in which members shown in FIG. 3 are coupled to each other.

FIG. 3 is an exploded perspective view of rechargeable batteries and a connection member according to the first exemplary embodiment of the present invention, and FIG. 4 is a transverse cross-sectional view of a state in which members shown in FIG. 3 are coupled to each other.

Referring to FIGS. 3 and 4, rechargeable batteries 10 and 20 are arranged at a predetermined interval, and the positive terminal 11 of one rechargeable battery 10 and the negative terminal 12 of the other rechargeable battery 20 are disposed adjacent to each other.

At this point, the bent terminal portion 11b of the positive terminal 11 is bent toward the negative terminal 12 and the bent terminal portion 12b of the negative terminal 12 is bent toward the positive terminal 11. The bent terminal portions 11b and 12b of the positive and negative terminals 11 and 12, respectively, are disposed adjacent to each other on the same plane at a predetermined interval.

In this state, a welding plate 40 and a connection member 30 are sequentially stacked on the bent terminal portions 11b and 12b. The connection member 30 includes a fixing portion 31 which is in close contact with the welding plate 40 and a supporting portion 35 which is bent at both sides of the fixing portion 31, and which is in close contact with the protruding terminal portions 11a and 12a. The welding plate 40, positioned between the fixing portion 31 and the bent terminal portions 11b and 12b, is made of a material having large electrical resistance, and is in close contact with the bent terminal portions 11b and 12b.

Figure 5:
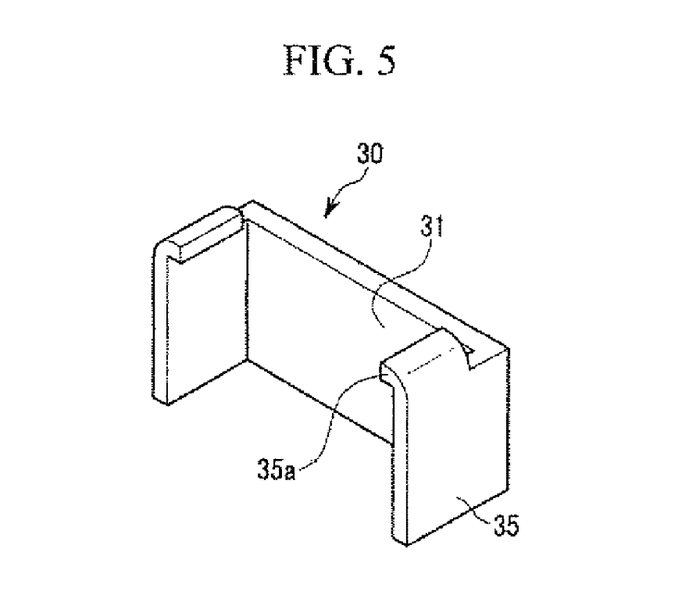
FIG. 5 is a perspective view of the connection member according to the first exemplary embodiment of the present invention.

FIG. 5 is a perspective view of the connection member according to the first exemplary embodiment of the present invention.

Referring to FIG. 5, the fixing portion 31 according to the exemplary embodiment has a substantially flat panel shape, and the supporting portion 35 has a flat panel shape which is bent in a perpendicular direction from both sides of the fixing portion 31. A projection portion 35a protruding toward the supporting portion opposite the projection portion is formed at an upper end of the supporting portion 35, and is supported on upper ends of the positive terminal 11 or the negative terminal 12.

As such, when the supporting portion 35 is formed, the connection member 30 can be installed at an accurate position in a horizontal direction, and the supporting portion 35 is in close contact with the protruding terminal portions 11a and 12a, thereby increasing the electrical contact area. Furthermore, when the projection portion 35a is formed, the connection member 30 can be installed at an accurate position in a vertical direction. As a result, since an additional jig for supporting the connection member 30 is not required at the time of welding the connection member 30, the manufacturing process is simplified, thereby improving productivity.

Figure 6:
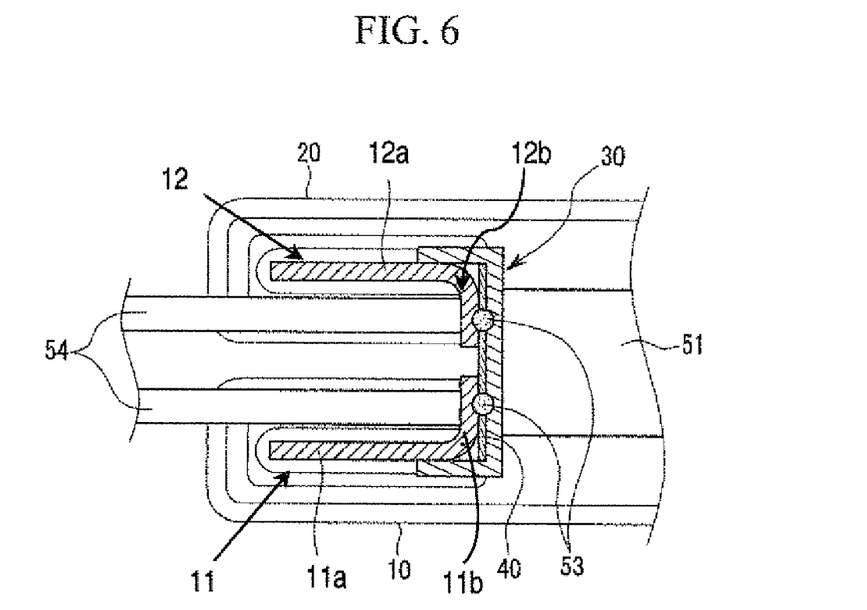
FIG. 6 is a cross-sectional view illustrating a process in which the connection member is bonded to the positive terminal and the negative terminal by welding according to the first exemplary embodiment of the present invention.

FIG. 6 is a cross-sectional view illustrating a process in which the connection member is bonded to the positive terminal and the negative terminal by welding according to the first exemplary embodiment of the present invention.

Referring to FIG. 6, in a state in which the welding plate 40 and the connection member 30 are sequentially installed in the positive terminal 11 and the negative terminal 12, a first welding rod 51 is positioned at the fixing portion 31 of the connection member 30, and two second welding rods 54 are positioned at the bent terminal portions 11b and 12b of the positive terminal 11 and the negative terminal 12. In this state, the connection member 30 is bonded to the positive terminal 11 and the negative terminal 12 through resistance welds 53 by applying a current. As such, according to the exemplary embodiment, the connection member 30 can be attached to the positive terminal 11 and the negative terminal 12 by one-time resistance welding.

The welding plate 40 is made of a material having electrical resistance which is larger than, and a melting point which is lower than, those of the connection member 30. As a result, since a large resistance and a large amount of heat are generated on the welding plate 40 at the time of the resistance welding, the connection member 30 and the positive and negative terminals 11 and 12, respectively, can be easily melted. Furthermore, the welding plate 40 having a low melting point is further melted in comparison with the connection member 30, and serves as an adhesive for bonding the positive and negative terminals 11 and 12 to the connection member 30. Accordingly, the connection member 30 can be more stably attached to the positive and negative terminals 11 and 12, respectively.

Figure 7:
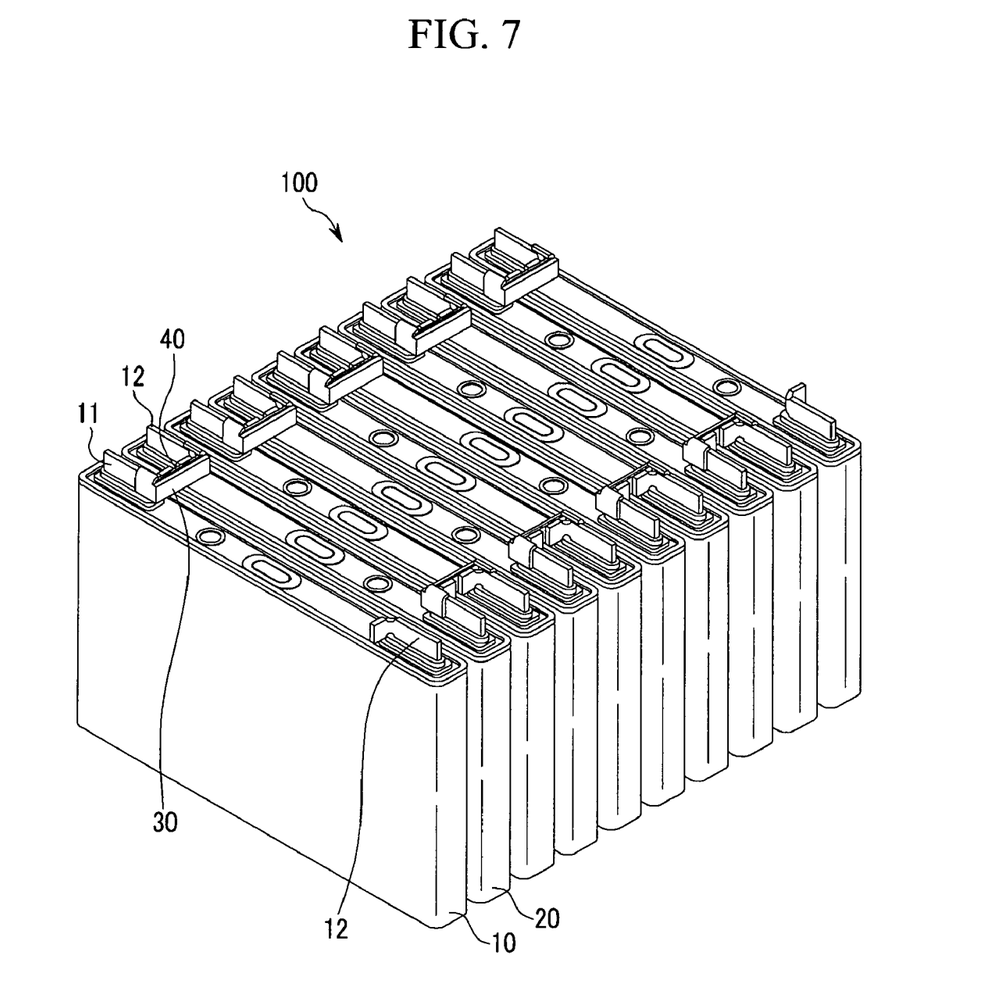
FIG. 7 is a perspective view of a battery module according to the first exemplary embodiment of the present invention.

FIG. 7 is a perspective view of a battery module according to the first exemplary embodiment of the present invention.

Referring to FIG. 7, in a state in which the plurality of rechargeable batteries 10 and 20 are disposed at predetermined intervals, after the connection member 30 is installed in the positive terminal 11 of one rechargeable battery 10 and the negative terminal 12 of the rechargeable battery 20 adjacent thereto, the positive terminal 11 and the negative terminal 12 are electrically connected to each other by bonding the connection member 30 and the positive and negative terminals 11 and 22 through welding, such that the rechargeable batteries 10 and 20 are connected to each other in series.

The connection member 30 is attached to the positive terminal 11 and the negative terminal 12 by welding, such that it is possible to prevent electrical contact between the connection member 30 and the positive and negative terminals 11 and 12, respectively, from being deteriorated due to external shock or vibration. Since the melted welding plate 40 serves as the adhesive, the connection member 30 is fixed to the positive and negative terminals 11 and 12, respectively, more stably.

Figure 8:
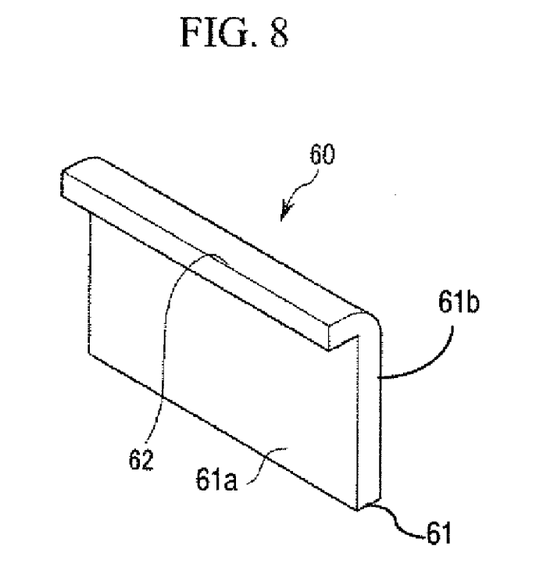
FIG. 8 is a perspective view of a connection member adopted in a battery module according to a second exemplary embodiment of the present invention.

FIG. 8 is a perspective view of a connection member adopted in a battery module according to a second exemplary embodiment of the present invention.

The battery module according to the exemplary embodiment has the same structure as the battery module according to the first exemplary embodiment except for the structure of the connection member. Therefore, the same components will not be repeatedly described.

Referring to FIG. 8, the connection member 60 according to the exemplary embodiment includes a fixing portion 61 and a projection portion 62 which is bent to one side at an upper end of the fixing portion 61.

The fixing portion 61 has a substantially rectangular flat panel shape. The projection portion 62 is configured by bending the upper end of the fixing portion 61. The fixing portion 61 is in close contact with the bent terminal portions 11b and 12b of FIGS. 3, 4, or 6 of the positive and negative terminals 11 and 12, respectively. The projection portion 62 is supported on upper ends of the bent terminal portions 11b and 12b.

Meanwhile, the connection member 60 according to the exemplary embodiment is made of a hetero junction metal (clad metal). The connection member 60 may have a structure in which nickel and copper are joined to each other, or a structure in which aluminum and copper are joined to each other.

At this point, a part 61a made of nickel or aluminum is in close contact with the bent terminal portions 11b and 12b, and a part 61b made of copper is disposed in a direction opposite thereto. Nickel and aluminum have greater resistance than, and a lower melting point than, copper. Therefore, when the connection member 60 is made of the hetero-junction metal, the connection member 60 can be easily attached to the positive terminal 11 and the negative terminal 12 of FIGS. 3, 4, or 6 by welding without the welding plate interposed between the connection member 60 and the positive and negative terminals 11 and 12, respectively.

Figure 9:
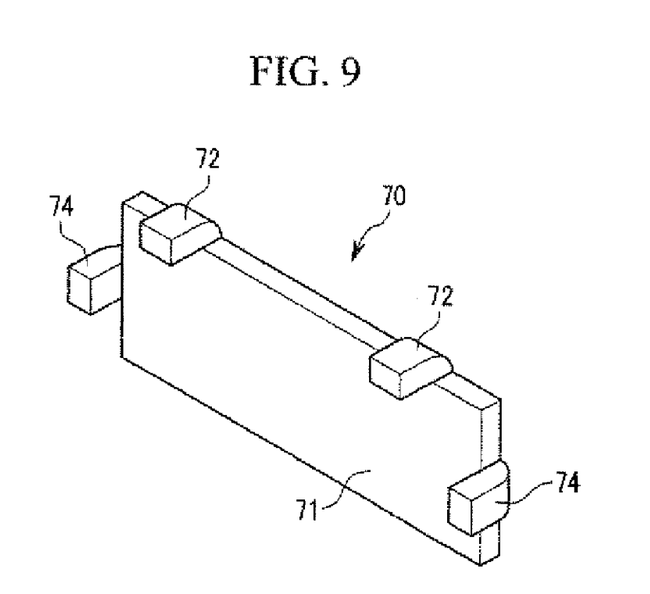
FIG. 9 is a perspective view of a connection member adopted in a battery module according to a third exemplary embodiment of the present invention.

FIG. 9 is a perspective view of a connection member adopted in a battery module according to a third exemplary embodiment of the present invention.

Referring to FIG. 9, a connection member 70 according to the exemplary embodiment includes a fixing portion 71 having a rectangular flat panel shape, and upper projection portions 72 and side projection portions 74 which protrude from the fixing portion 71.

Two upper projection portions 72 are separated from each other at an upper end of the fixing portion 71, and side projection portions 74 protrude from respective sides of the fixing portion 71.

The upper projection portions 72 and the side projection portions 74 protrude from the same surfaces. The upper projection portions 72 and the side projection portions 74 are supported on the positive and negative terminals 11 and 12, respectively, of FIGS. 3, 4, or 6 such that the connection member 70 can be installed at an accurate position.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery module, comprising:
a plurality of unit batteries, each unit battery including a positive terminal and a negative terminal which protrude outside said each unit battery and which have bent terminal portions; and
a connection member for electrically connecting adjacent unit batteries with each other;
wherein the connection member comprises a fixing portion fixed to the bent terminal portion of the positive terminal of a first unit battery and to the bent terminal portion of the negative terminal of a second unit battery adjacent to the first unit battery by welding; and
wherein projection portions, each of which is in contact with a top surface of a respective one of the positive and negative terminals, are formed in the connection member.

2. The battery module of claim 1, wherein the bent terminal portion formed in the positive terminal of the first unit battery and the bent terminal portion formed in the negative terminal of the second unit battery are bent in different directions.

3. The battery module of claim 1, wherein the bent terminal portion formed in the positive terminal of the first unit battery and the bent terminal portion formed in the negative terminal of the second unit battery are positioned on a same plane.

4. The battery module of claim 1, wherein each of the positive and negative terminals includes a protruding terminal portion, the bent terminal portion being bent from the protruding terminal portion.

5. The battery module of claim 4, wherein grooves are formed at a bent edge of each of the positive and negative terminals such that the bent terminal portion is easily bent.

6. The battery module of claim 4, wherein the connection member comprises supporting portions, each of which is bent from the fixing portion and is in contact with a respective protruding terminal portion.

7. The battery module of claim 1, wherein a welding plate having greater electrical resistance than the connection member is installed between the connection member and the bent terminal portions.

8. The battery module of claim 7, wherein the welding plate has a lower melting point than the connection member.

9. The battery module of claim 7, wherein the connection member is fixed to said each of the positive and negative terminals by resistance welding.

10. The battery module of claim 1, wherein the connection member is made of a hetero-junction metal.

11. The battery module of claim 10, wherein a metal disposed on a surface of the connection member which faces the bent terminal portions has a lower melting point than a metal disposed on a surface of the connection member which faces a direction opposite to a direction of the bent terminal portions.

12. A battery module, comprising:
a plurality of unit batteries, each unit battery including a positive terminal and a negative terminal which protrude outside said each unit battery and which have bent terminal portions; and
a connection member for electrically connecting the unit batteries with each other, and including a fixing plate fixed to the bent terminal portions of adjacent unit batteries by welding, wherein the fixing plate comprises a fixing portion fixed to the bent terminal portions of the positive and negative terminals by welding, and a supporting portion which is bent from the fixing portion; and
wherein a projection portion, which is in contact with a top surface of said each of the positive and negative terminals, is formed in the supporting portion.

13. The battery module of claim 12, wherein the bent terminal portion formed in the positive terminal and the bent terminal portion formed in the negative terminal are bent in different directions.

14. The battery module of claim 12, wherein the bent terminal portion formed in the positive terminal and the bent terminal portion formed in the negative terminal are positioned on a same plane.

15. The battery module of claim 12, wherein each of the positive and negative terminals includes a protruding terminal portion, the bent terminal portion being bent from the protruding terminal portion.

16. The battery module of claim 15, wherein grooves are formed at a bent edge of each of the positive and negative terminals such that the bent terminal portion is easily bent.

17. The battery module of claim 15, wherein the supporting portion is in contact with the protruding terminal portion.

18. The battery module of claim 12, wherein a welding plate having greater electrical resistance than the connection member is installed between the connection member and the bent terminal portions.

* * * * *